US010369951B2

(12) United States Patent
Tabushi et al.

(10) Patent No.: US 10,369,951 B2
(45) Date of Patent: Aug. 6, 2019

(54) AIR BAG DEVICE

(71) Applicant: AUTOLIV DEVELOPMENT AB, Vargarda (SE)

(72) Inventors: Hiroya Tabushi, Yokohama (JP); Yutaka Nakajima, Yokohama (JP); Tomohiro Sumiya, Yokohama (JP); Kai Maenishi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/559,773

(22) PCT Filed: Jan. 8, 2016

(86) PCT No.: PCT/JP2016/050487
§ 371 (c)(1),
(2) Date: Sep. 19, 2017

(87) PCT Pub. No.: WO2016/147683
PCT Pub. Date: Sep. 22, 2016

(65) Prior Publication Data
US 2018/0065583 A1 Mar. 8, 2018

(30) Foreign Application Priority Data

Mar. 19, 2015 (JP) .................................. 2015-056385

(51) Int. Cl.
B60R 21/233 (2006.01)
B60R 21/205 (2011.01)
(Continued)

(52) U.S. Cl.
CPC ........ B60R 21/205 (2013.01); B60R 21/0136 (2013.01); B60R 21/231 (2013.01);
(Continued)

(58) Field of Classification Search
CPC .. B60R 21/205; B60R 21/233; B60R 21/2338
See application file for complete search history.

(56) References Cited

U.S. PATENT DOCUMENTS

2003/0030255 A1* 2/2003 Igawa ................... B60R 21/206
280/730.1
2003/0218325 A1* 11/2003 Hasebe ................. B60R 21/233
280/743.2
(Continued)

FOREIGN PATENT DOCUMENTS

JP 03032956 A * 2/1991
JP H08324373 A 12/1996
(Continued)

OTHER PUBLICATIONS

Ryosuke Honda, Automobile Air Bag Relaxing Oblique Impact, Dec. 10, 1996, JPO, JP 08-324373 A, Machine Translation of Description (Year: 1996).*
(Continued)

Primary Examiner — James A English
(74) Attorney, Agent, or Firm — Brinks Gilson & Lione

(57) ABSTRACT

An airbag apparatus which is capable of restraining an occupant in a stable position even during an oblique collision, and which is capable of suppressing an injury value of the occupant. An airbag apparatus 100 restrains an occupant 132 of a vehicle. The airbag apparatus 100 is provided with: a main bag 112 which is bag-shaped and inflates and deploys in front of a front passenger seat 104 of the vehicle; and a center bag 114 which is bag-shaped and inflates and deploys on an inner side of the main bag 112 in a vehicle width direction. The center bag 114 has a rear region 160 which extends further towards a rear of the vehicle than the main bag 112, and a curved surface 164, which projects towards a main bag 112 side in the vehicle width direction, is formed on the rear region 160.

13 Claims, 10 Drawing Sheets

(51) Int. Cl.

| | |
|---|---|
| *B60R 21/231* | (2011.01) |
| *B60R 21/2338* | (2011.01) |
| *B60R 21/0136* | (2006.01) |
| *B60R 21/235* | (2006.01) |
| *B60R 21/239* | (2006.01) |
| *B60R 21/264* | (2006.01) |
| *B60R 21/276* | (2006.01) |
| *B60R 21/00* | (2006.01) |
| *B60R 21/01* | (2006.01) |
| *B60R 21/26* | (2011.01) |

(52) U.S. Cl.
CPC .......... *B60R 21/233* (2013.01); *B60R 21/235* (2013.01); *B60R 21/239* (2013.01); *B60R 21/2338* (2013.01); *B60R 21/264* (2013.01); *B60R 21/276* (2013.01); *B60R 2021/0009* (2013.01); *B60R 2021/0048* (2013.01); *B60R 2021/01027* (2013.01); *B60R 2021/23107* (2013.01); *B60R 2021/23161* (2013.01); *B60R 2021/23308* (2013.01); *B60R 2021/23386* (2013.01); *B60R 2021/23509* (2013.01); *B60R 2021/23547* (2013.01); *B60R 2021/23576* (2013.01); *B60R 2021/26076* (2013.01)

(56) References Cited

U.S. PATENT DOCUMENTS

| | | | | |
|---|---|---|---|---|
| 2015/0343986 | A1* | 12/2015 | Schneider | B60R 21/205 280/729 |
| 2015/0367802 | A1* | 12/2015 | Fukawatase | B60R 21/205 280/732 |
| 2016/0046257 | A1* | 2/2016 | Yamada | B60R 21/2338 280/729 |

FOREIGN PATENT DOCUMENTS

| | | |
|---|---|---|
| JP | 2004189187 A | 7/2004 |
| JP | 2010241241 A | 10/2010 |

OTHER PUBLICATIONS

Haruhisa Kore, Air Bag Device for Automobile, Feb. 13, 1991, JPO, JP 03-032956 A, Machine Translation of Description (Year: 1991).*
Haruhisa Kore, Air Bag Device for Automobile, Feb. 13, 1991, JPO, JP 03-032956 A, English Abstract (Year: 1991).*
International Search Report of PCT/JP2016/050487, dated Apr. 5, 2016.

* cited by examiner

VIEW FROM ARROW A

AIR BAG DEVICE

CROSS-REFERENCE TO RELATED APPLICATIONS

This application is a 35 U.S.C. § 371 national phase application of International Application No.: PCT/JP2016/050487, filed Jan. 8, 2016, which claims the benefit of priority under 35 U.S.C. § 119 to Japanese Patent Application No.: 2015-056385, filed Mar. 19, 2015, the contents of which are incorporated herein by reference in their entirety.

FIELD OF THE INVENTION

The present invention relates to an airbag apparatus for restraining an occupant of a vehicle from the front of the vehicle.

BACKGROUND

Airbags are almost a standard fixture in vehicles of recent years. An airbag is a safety apparatus that operates during an emergency such as a vehicle collision, and inflates and deploys due to gas pressure so as to restrain and thereby protect an occupant. There are various types of airbag apparatus, which vary according to installation location and application. For example, in order to protect an occupant of a front seat mainly from an impact in a front-rear direction, a front airbag is provided in the center of a steering wheel in front of a driver seat, and a passenger airbag is provided in an instrument panel or another area in the vicinity of a front passenger seat. In addition, in order to protect occupants in front and rear rows from a side collision and subsequent rollover (overturn), a curtain airbag, which inflates and deploys along a side window, is provided in the vicinity of a roof, and a side airbag, which inflates and deploys immediately beside an occupant, is provided in a side portion of a seat.

The airbag arrangement structure disclosed in Japanese Patent Application Publication No.: H06-80057 can also be adapted for front seats accommodating three people. In accordance with this reference, a third airbag unit for restraining an occupant of a center seat inflates and deploys in addition to a first airbag unit for restraining an occupant of a driver seat and a second airbag unit for restraining an occupant of a front passenger seat. The third airbag unit is installed in the vicinity of a sun visor on a ceiling, and inflates and deploys in a downward direction between the occupant of the center seat and an instrument panel.

SUMMARY

At present, there is a demand for airbag apparatuses that can deal with irregular collisions and impacts such as, for example, so-called oblique collisions in which an impact is exerted on a vehicle from an obliquely frontward/rearward direction. An occupant involved in an oblique collision enters an airbag cushion (hereinafter referred to as "cushion"), which exists in front of a seat, in an irregular manner such as from an oblique direction. In such a case, with the airbag arrangement structure of the previously mentioned cited reference, for example, an occupant of the front passenger seat comes into contact with the third airbag unit which exists in front of the occupant on an inner side in a vehicle width direction (hereinafter referred to as "vehicle inner side"). However, it is difficult to achieve sufficient occupant restraining force and suppress an injury value of an occupant simply by installing another cushion obliquely forward of the occupant.

In view of this problem, an object of the present invention is to provide an airbag apparatus which enables an occupant to be restrained in a stable position even during an oblique collision, and which enables an injury value of the occupant to be supressed.

In order to solve the abovementioned problem, the representative structure of the airbag apparatus according to the present invention is an airbag apparatus for restraining an occupant of a vehicle, the airbag apparatus including a main bag which is bag-shaped and inflates and deploys in front of a seat of the vehicle, and a center bag which is bag-shaped and inflates and deploys on an inner side of the main bag in a vehicle width direction, wherein the center bag includes a rear region which extends further towards a rear of the vehicle than the main bag, and a curved surface, which projects towards a main bag side in the vehicle width direction, is formed on the rear region.

As described above, in an oblique collision, an occupant of a front passenger seat may move obliquely forward towards a vehicle inner side. In such a case, when a head of the occupant comes into contact with a conventional main bag which exists in front of the front passenger seat, the head may rotate clockwise about the neck when viewed from above.

Hence, in the present invention, a rear region of a center bag provided on a vehicle inner side of a main bag projects further towards the rear of the vehicle than the main bag. With this configuration, the head of the occupant moving obliquely forward towards the vehicle inner side comes into contact with the center bag mainly from a temporal region at the same time as, immediately before, or immediately after contacting the main bag provided in front of the occupant. As a result, clockwise rotation of the head of the occupant can be reduced or nullified. In particular, as an angular velocity of the rotation of the head of the occupant can be reduced, an injury value of the occupant associated with this rotation may be suppressed.

Further, in the present invention, a curved surface, which projects towards the main bag side in the vehicle width direction, is formed on the rear region of the center bag described above. The center bag tends to come into contact with the temporal region of the occupant due to the projecting curved surface, such that the temporal region can be actively restrained. Accordingly, clockwise rotation that may occur in the head of the occupant can be more actively reduced or nullified, such that an injury value can be efficiently suppressed.

The curved surface described above may overlap the main bag when viewed from the rear of the vehicle. The curved surface projects so as to overlap the rear part of the main bag, whereby the head of the occupant can be restrained more efficiently.

A first vertex, which is an area of the curved surface that projects furthest in the vehicle width direction, may be positioned further towards the rear of the vehicle than a second vertex, which is an area of the head of the occupant that projects furthest towards the center bag side in the vehicle width direction when the head of the occupant comes into contact with a rear end portion of the main bag. With this configuration, the center bag restrains the head of the occupant to an occipital region side thereof, whereby an injury value of the occupant can be more efficiently suppressed.

A first base fabric blank, which constitutes the main bag side of the above-described rear region in the vehicle width direction, may have an area larger than that of a second base fabric blank, which constitutes a side surface on an opposite side thereto in the vehicle width direction. This configuration makes it possible to realise a center bag in which a curved surface can be formed on the side surface of the rear region of the center bag on the main bag side thereof in the vehicle width direction.

The airbag apparatus may be further provided with a tether belt which is belt-shaped, bridges at least two areas inside the center bag, and limits a dimension in a prescribed region of the center bag such that an interior pressure of the rear region is increased in order to cause the rear region to expand in the vehicle width direction. This configuration also makes it possible to realise a center bag in which a curved surface can be formed on the side surface of the rear region of the center bag on the main bag side thereof in the vehicle width direction.

The tether belt described above may be connected to at least one of an upper portion and a rear portion inside the rear region, and may limit a vertical dimension or a vehicle front-rear dimension of the rear region such that the rear region is caused to expand in the vehicle width direction. This configuration allows the curved surface to be formed efficiently on the center bag.

The airbag apparatus may restrain the head of the occupant at a vehicle rear side of a cleft between the main bag and the center bag. With this configuration, the temporal region is brought into contact with the center bag, and the head of the occupant is restrained so as to be guided into the cleft provided between the main bag and the center bag. Accordingly, the airbag apparatus more efficiently restrains the head of the occupant and an injury value can be further suppressed.

The main bag and the center bag may be integrated with each other below the cleft. The cleft needs to be provided in a position that the head of the passenger may come into contact with and, by integrating the main bag and the center bag below the cleft, it is possible to suitably restrain, for example, the chest and so on of the occupant.

The airbag apparatus may be further provided with a tether belt which is belt-shaped and connected to a first connecting portion on an upper portion of the center bag on the vehicle rear side and a second connecting portion on an upper portion of the main bag, and it is preferable that the tether belt has a length causing the same to tense (i.e. tension) as the main bag and the center bag inflate and deploy and move in directions such that the first connecting portion and the second connecting portion separate from each other.

With the configuration described above, the center bag is supported by the main bag via the tether belt. For this reason, even when the head of the occupant comes into contact with the center bag from the vehicle outer side, movement of the center bag towards the vehicle interior side and away from the main bag is prevented and the narrowness of the cleft is maintained, hence the head can be suitably guided into the cleft and restrained.

The second connecting portion described above may be provided at a portion of the upper portion of the main bag on the inner side in the vehicle width direction. With this configuration, the length of the tether belt is shorter than when the second connecting portion is provided on the vehicle outer side of the main bag. In this way, the reactive force applied to the head of the occupant via the center bag can be adjusted by altering the length of the tether belt.

The second connecting portion described above may be provided further towards the front of the vehicle than the first connecting portion. This configuration also ensures that, when the occupant comes into contact with the center bag from the vehicle outer side, the center bag is capable of efficiently restraining the temporal region of the occupant without losing structural integrity.

The main bag described above may come into contact with a windshield of the vehicle and an upper surface of an instrument panel of the vehicle due to the inflation and deployment. In other words, it is favourable for the main bag to inflate and deploy so as to be sandwiched between the windshield and the instrument panel. With this configuration, the structure of the main bag can be stabilised even when the occupant enters, and the structure of the center bag connected the main bag by the tether belt is also further stabilised.

It is preferable for the airbag apparatus to be further provided with a housing which is box-shaped, houses the main bag and the center bag, and is provided on an inner side of the upper surface of the instrument panel of the vehicle, wherein the main bag and the center bag rip open the upper surface of the instrument panel so as to inflate and deploy. This configuration enables suitable realisation of a front seat airbag apparatus that demonstrates high occupant restraining performance.

With the present invention, an airbag apparatus can be provided which enables an occupant to be restrained in a stable position even during an oblique collision, and which enables an injury value of the occupant to be supressed.

DETAILED DESCRIPTION OF THE INVENTION

Figure 1A:
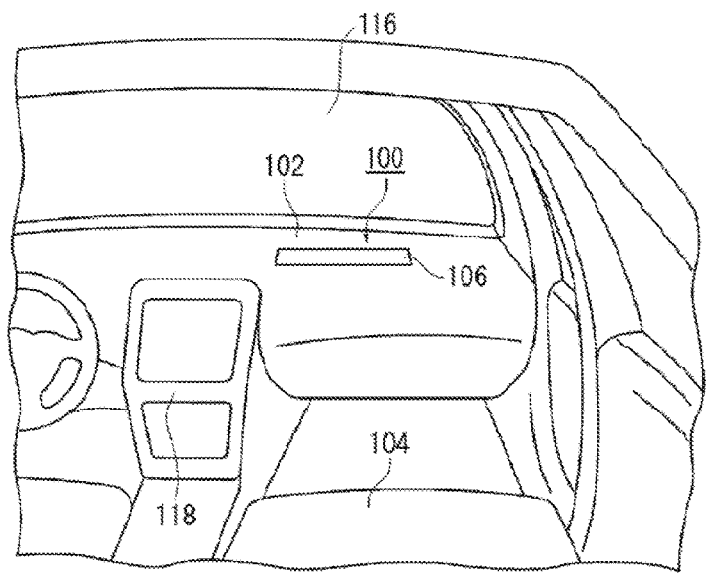
FIGS. 1(a) and 1(b) are diagrams illustrating an outline of an airbag apparatus according to an embodiment of the present invention.

Preferred embodiments of the present invention will be described hereinafter in detail with reference to the accompanying drawings. Dimensions, materials, other specific numerical values, and the like disclosed in the embodiments are merely examples to facilitate understanding of the invention and, unless indicated otherwise, do not limit the present invention. Note that, in this description and in the drawings, elements which have a substantially similar function or configuration will be denoted by identical reference numerals, thereby eliminating redundant explanations, and elements that are not directly related to the present invention will be omitted.

Figure 1B:
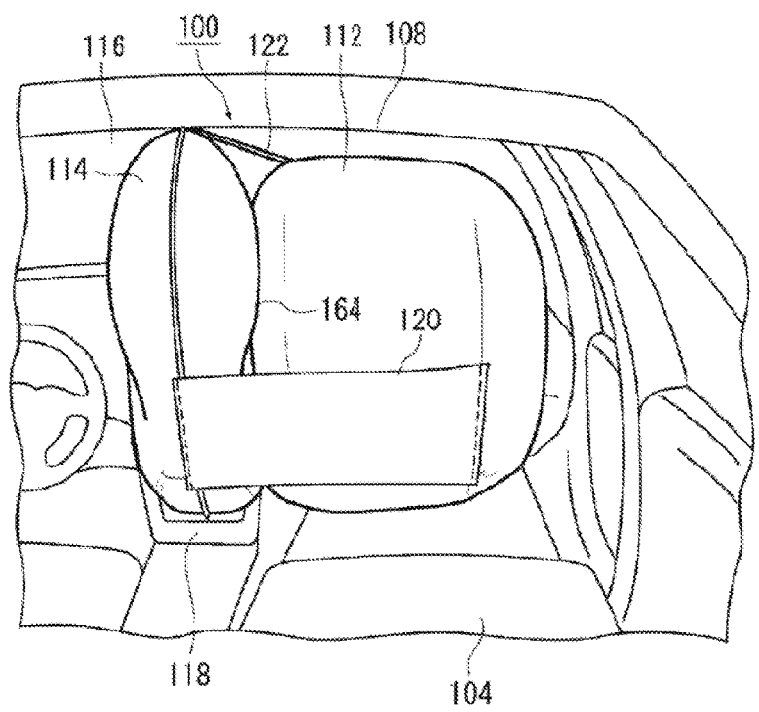

FIGS. 1(a) and 1(b) are diagrams illustrating an outline of an airbag apparatus 100 according to an embodiment of the present invention. FIG. 1(a) is a diagram illustrating a vehicle prior to operation of the airbag apparatus 100. In the present embodiment, the airbag apparatus 100 is embodied as an airbag apparatus for a front passenger seat (front row right side seat) in a left-hand drive vehicle. The airbag apparatus 100 is installed on an inner side of an upper surface 106 of an instrument panel 102 on a front passenger seat 104 side.

When the airbag apparatus 100 receives an impact detection signal from a sensor (not shown), a cushion 108 (see FIG. 1(b)) rips open the upper surface 106 so as to inflate and deploy towards the rear of the vehicle. FIG. 1(b) is a diagram illustrating the vehicle after operation of the airbag apparatus 100. The cushion 108 of the airbag apparatus 100 restrains an occupant 132 (see FIG. 4(a)) of the front passenger seat 104 from the front of the vehicle. The cushion 108 is bag-shaped, and inflates and deploys due to gas supplied thereto from an inflator 110 (see FIG. 4(a)). The cushion 108 is formed by sewing or adhering together a plurality of base fabric blanks constituting a surface thereof, or by spinning and weaving, etc., using an OPW (One-Piece Woven) method.

The cushion 108 of the airbag apparatus 100 includes two portions, namely, a main bag 112 and a center bag 114. The main bag 112 is a portion which has a large capacity and inflates and deploys on a front side of the front passenger seat 104. The main bag 112 inflates and deploys so as to fill a space between the occupant 132 of the front passenger seat 104, the instrument panel 102, and a windshield 116. As a result, collision of the occupant 132 with the instrument panel 102 is prevented. Further, by preventing collision of the occupant 132 with the windshield 116, the occupant 132 is also prevented from being thrown outside the vehicle.

The center bag 114 is a flat portion which inflates and deploys on a vehicle inner side of the main bag 112 and has a smaller capacity than the main bag 112. The center bag 114 inflates and deploys in front of a center console 118 when viewed from the occupant 132 (see FIG. 4(a)), and prevents movement towards the vehicle inner side or collision with the center console 118 of the occupant 132 during an oblique collision or the like. Lower portions of the main bag 112 and the center bag 114 are connected by a cloth-like tie panel 120 so as to be integrated with each other.

Figure 2A:
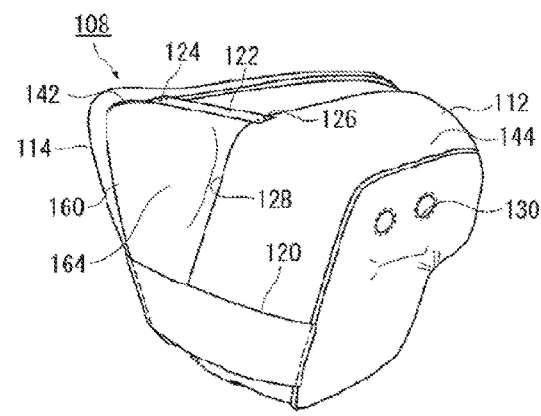
FIGS. 2(a), 2(b), and 2(c) are diagrams illustrating the cushion during inflation and deployment shown in FIG. 1(b) from each direction.

FIGS. 2(a) to 2(c) and FIGS. 3(a) and 3(b) are diagrams illustrating the cushion 108 during inflation and deployment shown in FIG. 1(b) from each direction. FIG. 2(a) is a perspective view illustrating the cushion 108 shown in FIG. 1(b) when viewed from above on a vehicle outer side. A cleft 128 is formed between the center bag 114 and the main bag 112. The cleft 128 separates the center bag 114 and the main bag 112 at the vehicle rear side. The cleft 128 is a portion that restrains, in particular, a head E1 of the occupant 132 (see FIG. 4(a)). An upper portion 142 of the center bag 114 is connected to the main bag 112 by a tether belt 122 so as to prevent separation of the center bag 114 from the main bag 112. The tether belt 122 and the tie panel 120 are arranged so as to be removed from a location with which the head E1 of the occupant 132 could come into contact, such that the cleft 128 is exposed.

Two vent holes 130 are provided in a side surface of the main bag 112 on the vehicle outer side. The vent holes 130 are so-called exhaust holes, and discharge gas supplied from the inflator 110 (see FIG. 4(a)) to the exterior. As the occupant 132 (see FIG. 4(a)) is not present on the vehicle outer side of the main bag 112, and only a side window, etc., exists on the vehicle outer side of the main bag 112, providing the vent holes 130 in the side surface of the main bag 112 on the vehicle outer side is viable.

Figure 2B:
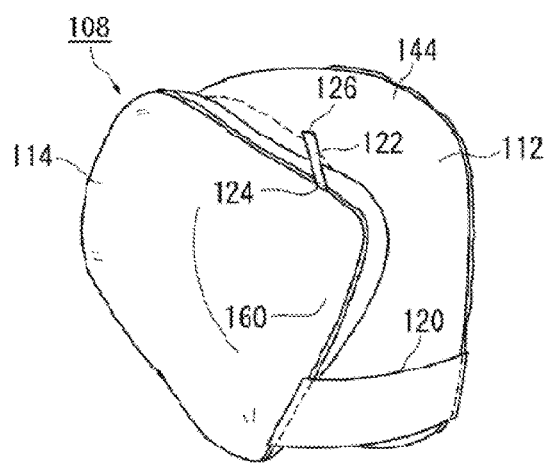

FIG. 2(b) is a perspective view illustrating the cushion 108 shown in FIG. 2(a) when viewed from above on a vehicle inner side. As illustrated in FIG. 2(b), the tether belt 122 connects the upper portion 142 of the center bag 114 and the upper portion 144 of the main bag 112. The tether belt 122 is belt-shaped and serves to support the structure of the center bag 114. The tether belt 122 is formed from, for example, base fabric of the same type as the cushion 108, and is connected to a first connecting portion 124 on the center bag 114 and a second connecting portion 126 on the main bag 112 by sewing.

Figure 2C:
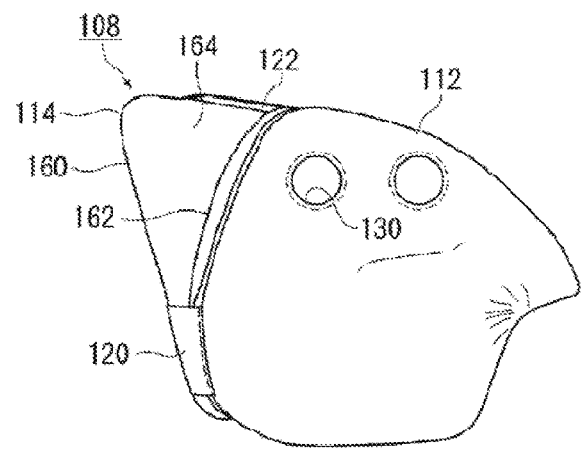

FIG. 2(c) is a diagram illustrating the cushion 108 shown in FIG. 2(b) when viewed from a vehicle outer side. As illustrated in FIG. 2(c), in the center bag 114 of the present embodiment, a rear region 160 on a vehicle rear side inflates and deploys so as to project further towards the rear of the vehicle (towards the left in FIG. 2(c)) than the main bag 112. Accordingly, the side surface of the center bag 114 on the vehicle outer side is exposed from the cleft 128. The center bag 114 mainly restrains a temporal region E1a of the occupant 132 (see FIG. 4(a)) by means of the side surface thereof on the vehicle outer side. As the center bag 114 is supported by the main bag 112 via the tether belt 122, the center bag 114 is capable of functioning as a reactive surface for restraining the temporal region E1a.

Figure 3A:
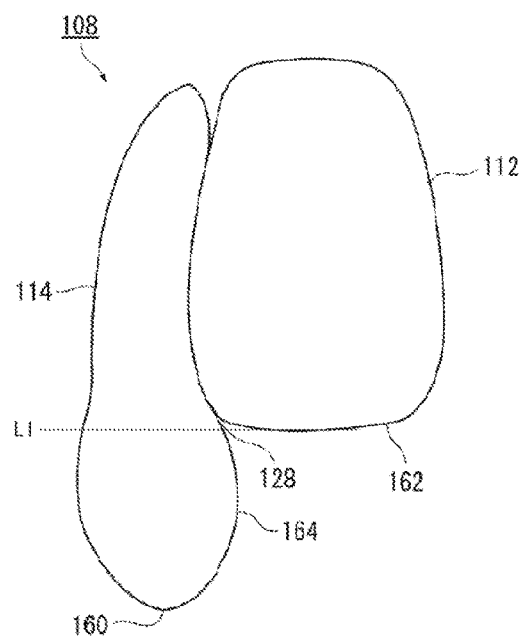
FIGS. 3(a) and 3(b) are diagrams illustrating the cushion during inflation and deployment shown in FIG. 1(b) from each direction.

FIG. 3(a) is a diagram illustrating the cushion 108 shown in FIG. 1(b) when viewed from above. As illustrated in FIG. 3(a), the rear region 160 extends further towards the rear of the vehicle than the rear end portion 162 of the main bag 112. In FIG. 3(a), for example, the rear region 160 extends below the virtual line L1 (the lower area in FIG. 3(a)), which extends in the vehicle width direction from the rear end portion 162 of the main bag 112.

Among the side surfaces of the rear region 160 in the vehicle width direction, the side surface on the main bag 112 side forms the curved surface 164. In the curved surface 164, the base fabric of the side surface of the main bag 112 side projects in an arc towards the main bag 112 side. The center bag 114 in the present embodiment restrains the temporal region E1a of the occupant 132 (see FIG. 5(b)) by means of the curved surface 164.

Figure 3B:
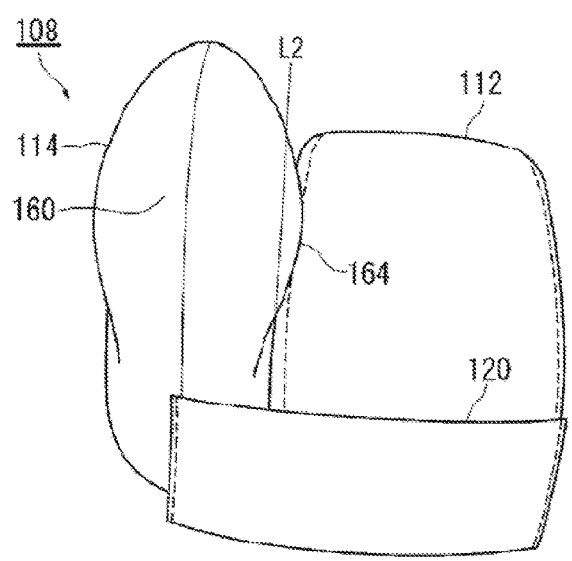

FIG. 3(b) is a diagram illustrating the cushion 108 shown in FIG. 3(a) when viewed from the rear of the vehicle. As illustrated in FIG. 3(b), the curved surface 164 projects towards the main bag 112 side to such a degree that, when viewed from the rear of the vehicle, the curved surface 164 overlaps the main bag 112 with a gentle curvature. In FIG. 3(b), for example, the curved surface 164 projects further towards the main bag 112 side (right side in FIG. 3(b)) than the vertical line L2 which extends along the end of the main bag 112 located furthest towards the vehicle inner side. With this configuration, the center bag 114 is capable of more efficiently restraining the head E1 of the occupant 132 (see FIG. 5(b)) during an oblique collision.

Figure 4A:
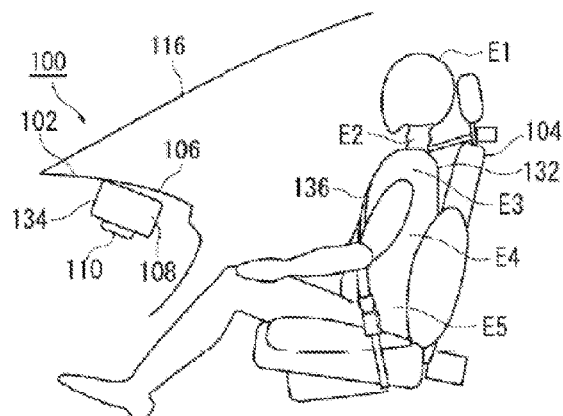
FIGS. 4(a), 4(b), and 4(c) are diagrams illustrating a process in which the cushion shown in FIG. 2(c) restrains an occupant.
Figure 4B:
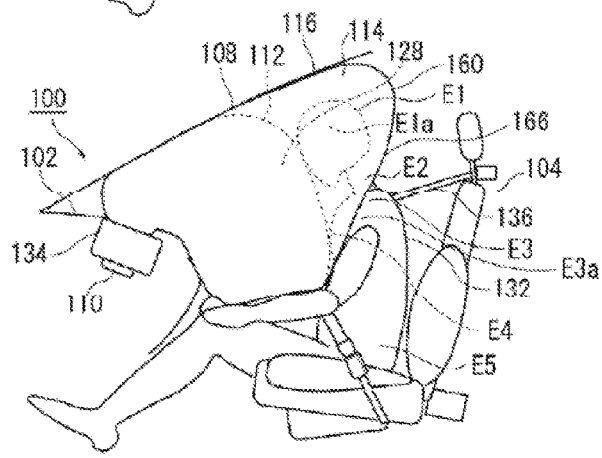
Figure 4C:
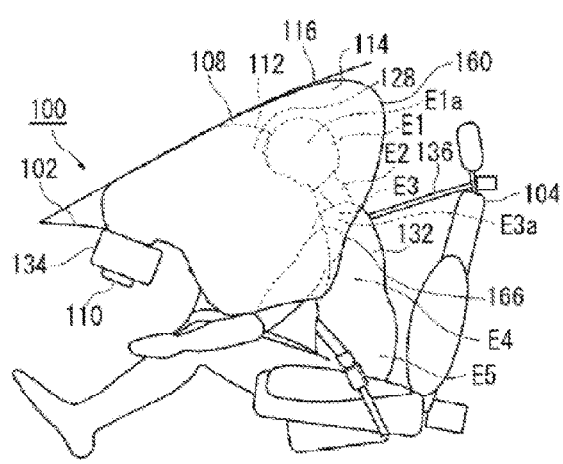

FIGS. 4(a) to 4(c) are diagrams illustrating a process in which the occupant 132 is restrained by the cushion 108 shown in FIG. 2(c). In each of the drawings shown in FIGS. 4(a) to 4(c), the left side represents the front of the vehicle. FIG. 4(a) is a diagram illustrating an undeployed state of the cushion 108. As illustrated in FIG. 4(a), both the main bag 112 and the center bag 114, which constitute the cushion 108, are housed in a housing 134. The housing 134 is formed, for example, as a box shape having an opening in an upper portion thereof, and houses the folded cushion 108.

An inflator 110 is installed on a bottom surface of the housing 134. As one example, a disk-shaped disk type inflator can be used as the inflator 110, although a cylinder-shaped cylinder inflator may also be used. Further, inflators popular at present include a type that is filled with a gas generating agent and generates gas by causing combustion thereof, a type which is filled with compressed gas and supplies the gas without generating heat, a hybrid type which uses both combustive gas and compressed gas, and so on. Any of these types of inflator can be used as the inflator 110.

On receiving an impact detection signal from a sensor (not shown), the airbag apparatus 100 receives gas from the inflator 110 and the cushion 108 begins to inflate. FIG. 4(b) is a diagram illustrating the cushion 108 having inflated and deployed. The cushion 108 rips open an upper surface 106 of the instrument panel 102, which serves as a lid of the housing 134, and inflates and deploys towards the rear of the vehicle. Within the cushion 108, the main bag 112 and the center bag 114 are connected, for example, by an internal vent hole (not shown), and are inflated and deployed using the shared inflator 110. The provision of an internal vent hole is not, however, essential. For example, the main bag 112 and the center bag 114 can also be formed as independent bags, and separate inflators used.

The occupant 132 illustrated in FIG. 4(b) enters the cushion 108 side to a larger extent than the occupant 132 in FIG. 4(a). During an emergency such as a vehicle collision, the occupant 132 moves towards the front of the vehicle due to inertia. When the occupant 132 is wearing the seat belt 136 such that a lumbar region E5 is restrained, the occupant 132 moves through a trajectory in which the upper body bends forward about the lumbar region E5.

The main bag 112 mainly restrains the head E1, the shoulders E3, the chest E4, and the like of the occupant 132. The main bag 112 having inflated and deployed is in contact with the windshield 116 and the upper surface 106 of the instrument panel 102. Due to the main bag 112 inflating and deploying so as to be sandwiched between the windshield 116 and the instrument panel 102, the occupant 132 can be restrained in a stable position even when the occupant 132 has entered the cushion 108 side.

The center bag 114 projects further towards the rear of the vehicle (right side in FIG. 4(b)) than the main bag 112. In an oblique collision, the occupant 132 may move obliquely forward towards the vehicle inner side, particularly with the left shoulder E3a, which is not restrained by the seat belt 136, leading. In this case, the occupant 132 comes into contact with the center bag 114 from the temporal region E1a.

FIG. 4(c) is a diagram illustrating a state in which the occupant 132 shown in FIG. 4(b) has further entered the cushion 108 side. As illustrated in FIG. 4(c), the temporal region E1a is brought into contact with the center bag 114, and the head E1 of the occupant 132 is guided into the cleft 128 as so that the head E1 of the occupant 132 is restrained by the cleft 128.

The rear end portion 166 of the rear region 160 of the center bag 114 is inclined in a straight line so as to gradually project towards the rear of the vehicle while advancing in an upward direction. The rear region 160 mainly restrains the left shoulder E3a of the occupant 132 on the vehicle inner side from the front of the vehicle and supports the upper body of the occupant 132 in conjunction with the main bag 112. In this way, twisting of the upper body is nullified.

Figure 5A:
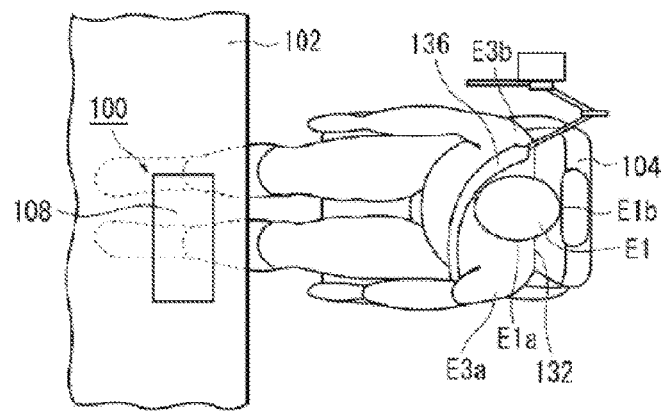
FIGS. 5(a), 5(b), and 5(c) are diagrams illustrating the process in which the cushion shown in FIGS. 4(a) to 4(c) restrain an occupant when viewed from above.
Figure 5B:
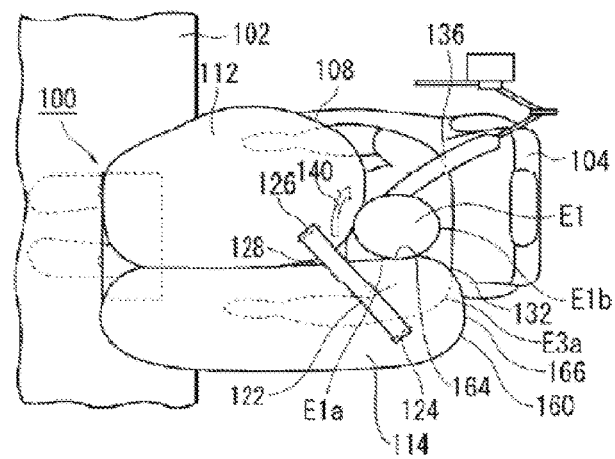
Figure 5C:
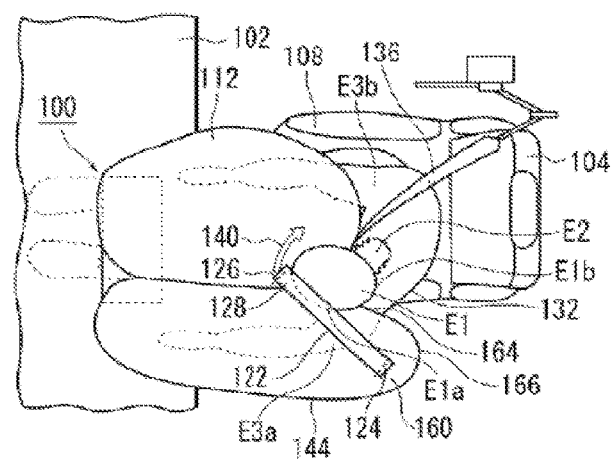

FIGS. 5(a) to 5(c) are diagrams illustrating the process in which the cushion 108 shown in FIGS. 4(a) to 4(c) restrain the occupant 132 when viewed from above. FIGS. 5(a) to 5(c) correspond respectively to FIGS. 4(a) to 4(c). The process in which the cushion 108 restrains the occupant 132 will be described hereinafter with reference to FIGS. 5(a) to 5(c).

As illustrated in FIG. 5(a), it is assumed that the occupant 132 of the front passenger seat 104 is seated while wearing the seat belt 136. In this case, when an impact occurs in the vehicle, an operation signal is transmitted from the sensor (not shown) to the airbag apparatus 100, and the cushion 108 inflates and deploys as shown in FIG. 5(b). In an oblique collision, the occupant 132 moves obliquely forward towards the vehicle inner side. In the present embodiment, the center bag 114 projects further towards the vehicle rear side than the main bag 112, and the head E1 of the occupant 132 comes into contact with the curved surface 164 on the vehicle outer side of the center bag 114 from the temporal region E1a.

FIG. 5(c) is a diagram in which the occupant 132 shown in FIG. 5(b) has further entered the cushion 108 side. When the head E1 of the occupant 132 moving obliquely forward comes into contact with the main bag 112 which exists in front of the front passenger seat 104, a rotation force (rotation 140 illustrated by the arrow) is generated in which the head E1 rotates clockwise about the neck E2 when viewed from above. Accordingly, in the present embodiment, the rear region 160 of the center bag 114 provided on the vehicle inner side of the main bag 112 extends further towards the rear of the vehicle than the main bag 112. In addition, the cleft 128 is provided between the main bag 112 and the center bag 114.

With this configuration, the temporal region E1a is brought into contact with the center bag 114, and the head E1 of the occupant 132 moving obliquely forward towards the vehicle inner side is restrained so as to enter the cleft 128. In particular, the present embodiment enables the head E1 to be actively restrained by the center bag 114 from the temporal region E1a to the occipital region E1b, thereby reducing or nullifying the rotation 140 of the head E1. With this configuration, the angular velocity of the rotation 140 of the head E1 of the occupant 132 can be reduced and an injury value of the head E1 associated with the rotation 140 can be supressed.

Figure 6:
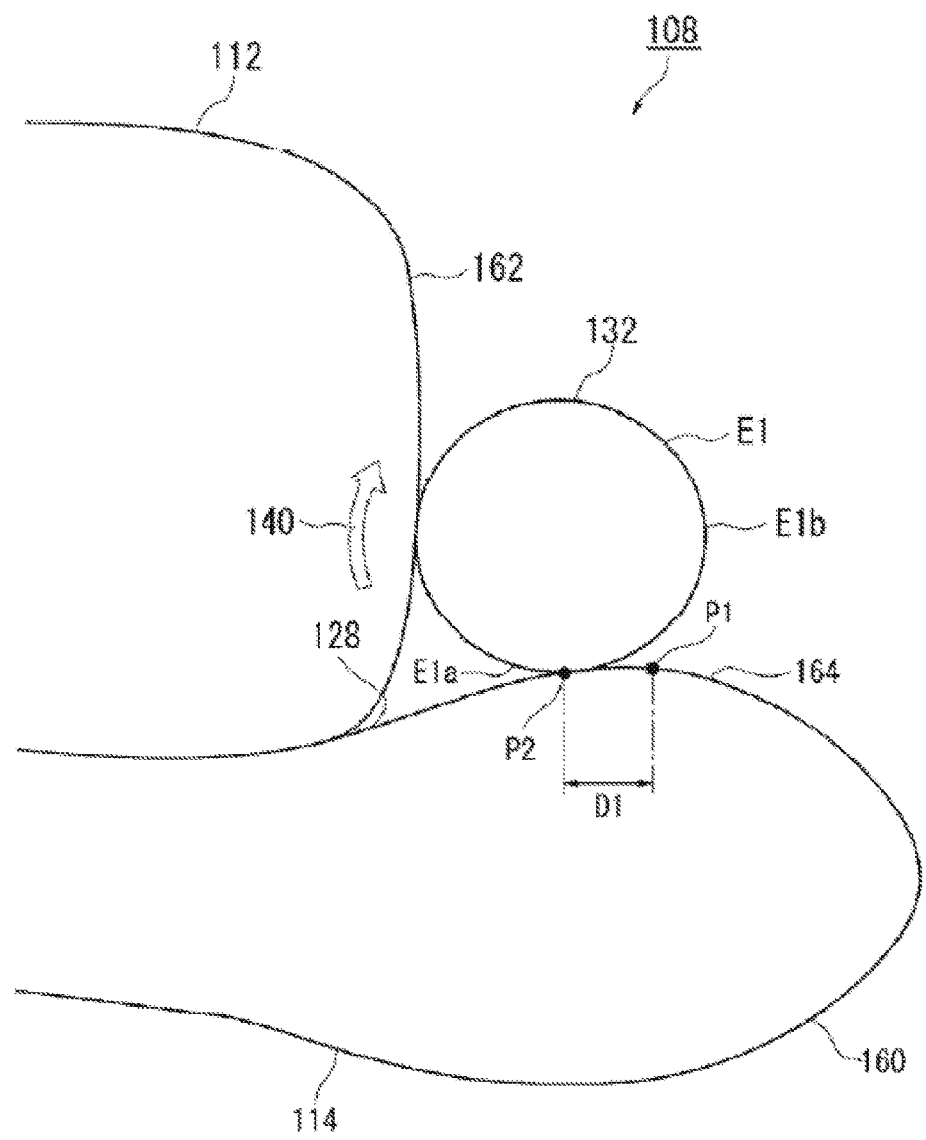
FIG. 6 is an enlarged partial view of the cushion having been come into contact with by an occupant shown in FIG. 5(b).

FIG. 6 is an enlarged partial view of the cushion 108 having been come into contact with by the occupant 132 shown in FIG. 5(b). As illustrated in FIG. 6, the curved surface 164 projects in the vehicle front-rear direction to the extent that the curved surface 164 overlaps the rear of the rear end portion 162 of the main bag 112. The center bag 114 tends to come into contact with the temporal region E1a of the occupant 132 via the projecting curved surface 164, such that the temporal region E1a can be more actively restrained.

In the present embodiment, a first vertex P1, which is an area of the curved surface 164 that projects furthest in the vehicle width direction, is set such that, when the head E1 of the occupant 132 comes into contact with the rear end portion 162 of the main bag 112, the first vertex P1 is positioned further towards the rear of the vehicle (the right side in FIG. 6) than a second vertex P2, which is an area of the head E1 that projects furthest towards the center bag 114 in the vehicle width direction, by a prescribed distance D1. With this configuration, the first vertex P1 of the curved surface 164 can come into contact with the head E1 of the occupant 132 at a point further towards the rear than the second vertex P2 thereof. Accordingly, the center bag 114 restrains the head E1 of the occupant 132 to the occipital region E1b side thereof, whereby an injury value of the occupant 132 can be more efficiently suppressed. Accordingly, the clockwise rotation 140 that could occur in the head E1 of the occupant 132 can be actively reduced or nullified, and an injury value efficiently suppressed.

Referring again to FIG. 5(b), the rear region 160 of the center bag 114 also restrains the left shoulder E3a of the occupant 132 via the rear end portion 166. The occupant 132 is restrained by the seat belt 136 from a right shoulder E3b on the vehicle outer side to a flank on the vehicle inner side, however, the left shoulder E3a is not restrained by the seat belt 136. For this reason, in an oblique collision, the occupant may move towards the front of the vehicle with the left shoulder E3a leading towards the front of the vehicle. In this case, the rear end portion of the center bag 114 restrains the left shoulder E3a from the front and from above, and the right shoulder E3b is subsequently restrained by the main bag 112. In this way, with the present embodiment, it is possible to reduce the angular velocity of the rotation of the head E1 and nullify rotation occurring in the upper body, such that an injury value of the occupant 132 can be further suppressed.

In the present embodiment, as described with reference to FIG. 4(b), the main bag 112 inflates so as to be sandwiched between the instrument panel 102 and the windshield 116, and the structure thereof is stable. As the center bag 114 is supported by the main bag 112 via the tether belt 122, separation of the center bag 114 from the main bag 112 is suppressed.

As illustrated in FIG. 5(b), the first connecting portion 124 of the tether belt 122 is provided on the upper portion 142 of the center bag 114 on the vehicle rear side. The second connecting portion 126 of the tether belt 122 is a vehicle inner side portion of the upper portion 144 of the main bag 112 and is provided further towards the front of the vehicle than the first connecting portion 124. In the center bag 114, the rear side of the upper portion thereof is pulled obliquely forward towards the vehicle outer side by the tether belt 122, such that the head E1 can be efficiently restrained in a stable position.

The length of the tether belt 122 is set to a length that tenses when the main bag 112 and the center bag 114 inflate and deploy and the first connecting portion 124 and the second connecting portion 126 move in directions so as to separate from each other. Due to the tensed tether belt 122, even if the heavy head E1 of the occupant 132 comes into contact with the center bag 114 from the vehicle outer side, the center bag 114 does not separate significantly from the main bag 112, and the narrowness of the cleft 128 is maintained such that the head E1 can be restrained.

Note that the position at which the second connecting portion 126 is provided can be changed as appropriate. For example, the second connecting portion 126 can also be provided at the center of the upper portion 144 of the main bag 112 in the vehicle width direction or at a vehicle outer side portion thereof. In the present embodiment, the second connecting portion 126 is provided at a vehicle inner side portion of the main bag 112, hence, in comparison to a case in which the second connecting portion 126 is provided at a vehicle outer side portion, etc., of the main bag 112, the overall length of the tether belt 122 is short, and the tether belt 122 tends to be tense. In this way, the length of the tether belt 122 can be altered by changing the position of the second connecting portion 126, such that the tenseness of the tether belt 122, the reactive force applied to the head E1 of the occupant 132 via the center bag 114, and the like can be changed as appropriate.

In the above description, it was stated with reference to FIG. 5(b) and the like that contact between the occupant 132 and the cushion 108 starts with the temporal region E1a coming into contact with the center bag 114. However, there are various forms of contact between the occupant 132 and the cushion 108, for example, simultaneous contact of the head E1 with both the center bag 114 and the main bag 112, contact in which the head E1 comes into contact with the main bag 112 first, etc. Moreover, there are cases where the head E1 comes into contact with the main bag 112 and the like after the shoulders E3 (see FIG. 4(b), etc.) or the chest E4 comes into contact with the main bag 112 and the like. However, with the configuration of the present embodiment, the head E1 of the occupant 132 can be effectively restrained in any of these cases by being guided to the interior of the cleft 128.

In FIG. 5(b), the clockwise rotation 140 was illustrated as an example of rotation that occurs in the head E1. However, in the front passenger seat of a right-hand drive vehicle, for example, the head E1 may rotate counterclockwise about the neck when viewed from above. With the cushion 108 of the present embodiment, this counterclockwise rotation can also be reduced or nullified using the cleft 128, such that the angular velocity of the head E1 can be reduced. In other words, with the airbag apparatus 100 of the present embodiment, the same effect can be achieved with respect to both clockwise or counterclockwise rotation occurring in the head E1.

Figure 7A:
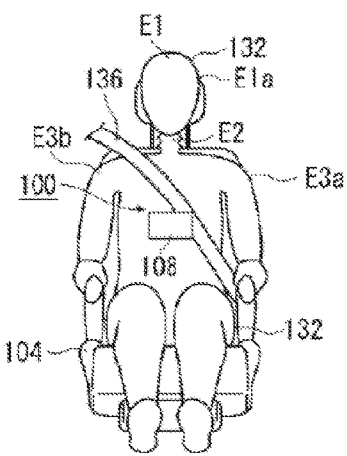
FIGS. 7(a), 7(b), and 7(c) are diagrams illustrating the process in which the cushion shown in FIGS. 4(a) to 4(c) restrain an occupant when viewed from the front of the vehicle.
Figure 7B:
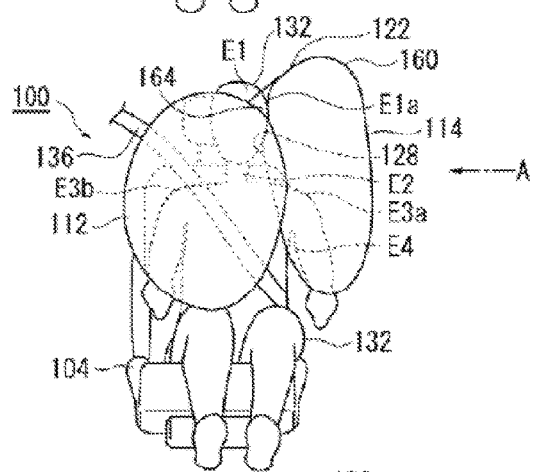
Figure 7C:
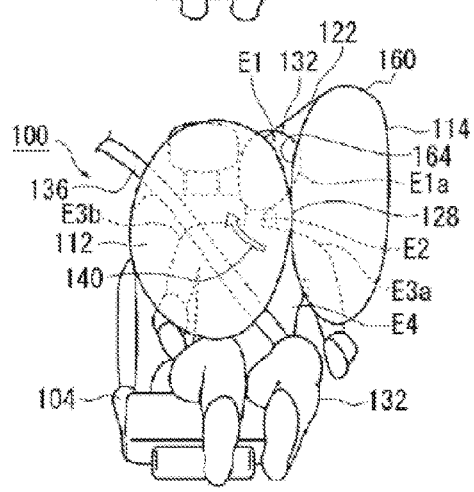

An attempt will also be made to explain the process in which the cushion 108 restrains the occupant 132 from another direction. FIGS. 7(a) to 7(c) are diagrams illustrating the process in which the cushion 108 shown in FIGS. 4(a) to 4(c) restrain the occupant 132 when viewed from the front of the vehicle. As illustrated in FIG. 7(a), it is assumed that the occupant 132 of the front passenger seat 104 is seated while wearing the seat belt 136. In this case, when an impact occurs in the vehicle, the main bag 112 inflates and deploys in front of the occupant 132, and the center bag 114 inflates and deploys in front of the occupant 132 on the vehicle inner side (right side in FIG. 7(b)) as shown in FIG. 7(b).

As illustrated in FIG. 7(b), the temporal region E1a of the occupant 132 having moved obliquely forward from the seated position towards the vehicle inner side is brought into contact with the curved surface 164 of the center bag 114. In addition, the left shoulder E3a, which is not restrained by the seat belt 136, is restrained by the rear end portion 166 (see FIG. 4(b)) of the rear region 160 of the center bag 114. As illustrated in FIG. 7(c), the head E1 advances towards the front of the vehicle while being guided by the center bag 114 and enters the cleft 128 so as to be restrained by the cleft 128.

Figure 8:
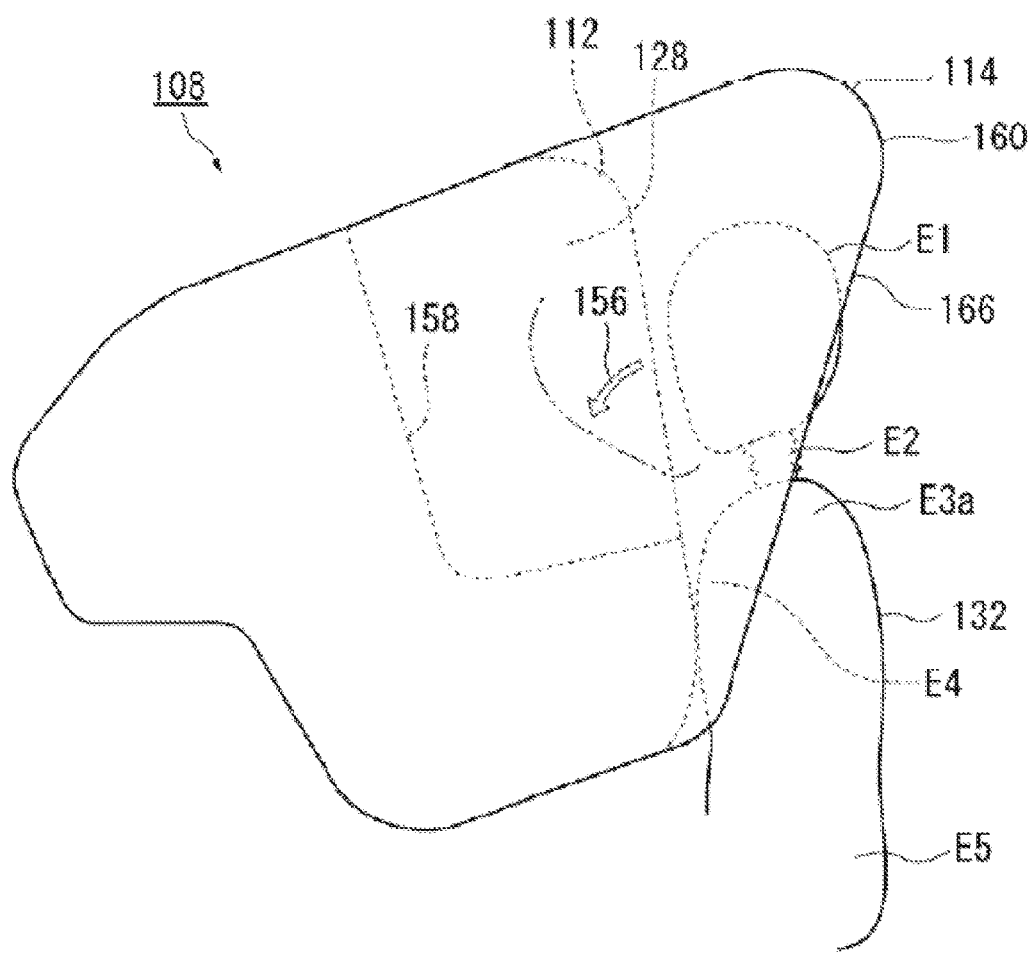
FIG. 8 is a schematic view of the cushion shown in FIG. 7(c) when viewed from arrow A.

FIG. 8 is a schematic view of the cushion 108 shown in FIG. 7(c) when viewed from arrow A. As illustrated in FIG. 8, when an impact occurs with respect to the vehicle, the upper body of the occupant 132 mainly moves so as to rotate towards the front of the vehicle about the lumbar region E5. At this time, the head E1 of the occupant 132 moves towards the front of the vehicle from the seated position and follows a trajectory 156 in a downward direction. In the present embodiment, the depth of the cleft 128 is considered on the basis of the trajectory 156 of the head E1.

FIG. 8 illustrates a connecting portion 158 between the center bag 114 and the main bag 112. The connecting portion 158 is also a portion constituting a bottom of the cleft 128 and determines the depth of the cleft 128. The connecting portion 158 is provided in one embodiment by means of sewing, the center bag 114 and the main bag 112 being structurally connected to each other, etc. In the present embodiment, the cleft 128 is set so that the head E1 of the occupant 132 does not come into contact with the connecting portion 158. The connecting portion 158 is provided so as to be removed from the trajectory 156 of the head E1 when, for example, the shoulders E3 of the occupant 132 are restrained by the center bag 114 or the main bag 112. With this configuration, the head E1 does not strike the connecting portion 158, and a cushion 108 in which safety is taken into further consideration can be realised.

The cleft 128 is provided at a location that the head E1 of the occupant 132 could come into contact with, and the main bag 112 and the center bag 114 are integrated with each other below the cleft 128. The area in which the main bag 112 and the center bag 114 are integrated is capable of appropriately restraining, for example, the shoulders E3, the chest E4, and the like of the occupant 132.

With the configuration described above, the center bag 114 is capable of suitably restraining the head E1 of the occupant 132, particularly the temporal region E1*a*. In particular, the curved surface 164 of the center bag 114 restrains the head E1 of the occupant 132 across a side slightly rearward of the center of gravity of the head E1, which extends from the temporal region E1*a* to the occipital region E1*b*. Restraint of the head E1 is then completed at the cleft 128 between the main bag 112 and the center bag 114. In addition, the rear end portion 166 of the center bag 114 restrains the left shoulder E3*a* of the occupant 132 from the front and from above. With these configurations, the rotation 140 that could occur in the head E1 and rotation of the upper body of the occupant 132 are suppressed, such that an injury value of the occupant 132 can be significantly suppressed.

Figure 9A:
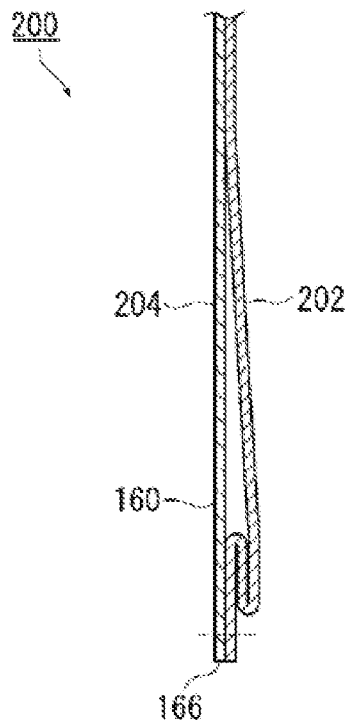
FIGS. 9(a) and 9(b) are diagrams illustrating a first modified example of the center bag shown in FIGS. 3(a) and 3(b).
Figure 9B:
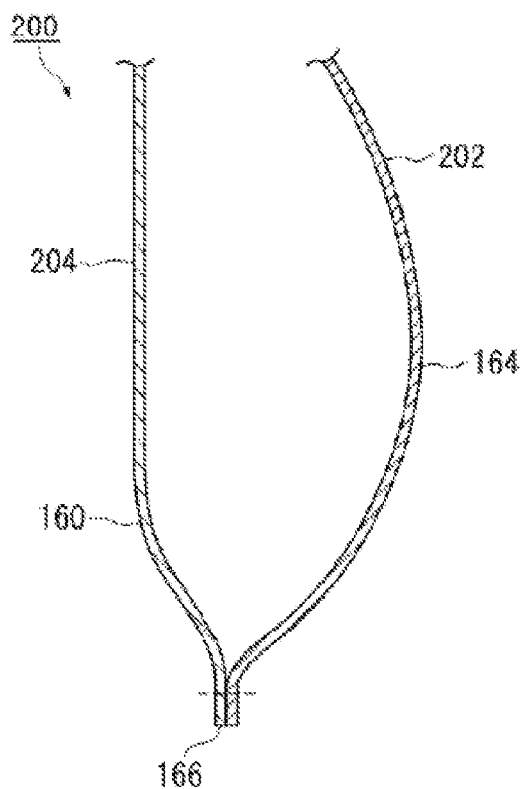

FIGS. 9(*a*) and 9(*b*) are diagrams illustrating a first modified example of the center bag 114 shown in FIGS. 3(*a*) and 3(*b*). FIG. 9(*a*) illustrates a state prior to inflation and deployment of a center bag 200 cut along a plane that extends in the vehicle front-rear and vehicle width directions when viewed from above. The center bag 200 has a different configuration to that of the center bag 114 in FIG. 3(*a*) in that the sizes of the respective base fabrics constituting the side surfaces in the vehicle width direction differ from each other. Note that, in the following description, constituent elements which are the same as constituent elements that have already been described are denoted by the same reference numerals, thereby eliminating description thereof.

In the center bag 200 shown in FIG. 9(*a*), of the side surfaces of the rear region 160 in the vehicle width direction, the first base fabric 202 constituting the side surface on the main bag 112 side (see FIG. 3(*a*)) has a larger area than that of the second base fabric 204 constituting the side surface on the opposite side thereto in the vehicle width direction. FIG. 9(*b*) is a diagram in which the center bag 200 shown in FIG. 9(*a*) is inflated and deployed. As illustrated in FIG. 9(*b*), the area of the first base fabric 202 is larger than the area of the second base fabric 204, hence the first base fabric 202 projects and inflates further towards the main bag 112 side (the right side in FIG. 9(*b*)) in the vehicle width direction.

The curved surface 164 is formed on the first base fabric 202 in this way. In this way, the curved surface 164 can also be formed on the center bag 200 by making the area of the first base fabric 202, which constitutes a side surface in the vehicle width direction, is large.

FIGS. 10(*a*) to 10(*c*) are diagrams illustrating further modified examples of the center bag 114 shown in FIGS. 3(*a*) and 3(*b*). Each of the center bags illustrated in FIGS. 10(*a*) to 10(*c*) schematically illustrate an internal configuration thereof. Each of the center bags differs from the center bag 114 in FIG. 3(*b*) in terms of being provided with a belt-shaped tether belt on an interior thereof.

A center bag 220 according to a second modified example illustrated in FIG. 10(*a*) is provided with a tether belt 222 on an interior thereof. The tether belt 222 is belt-shaped, and a vertical tether 224 which extends in a vertical direction is connected to a horizontal tether 226 extending in the vehicle width direction midway therealong, thereby forming a three-pronged structure. The vertical tether 224 is connected, with respect to the center bag 220, to an upper portion 228 inside the rear region 160 thereof. The horizontal tether 226 is bridged between a side portion 230 on the main bag 112 side and a side portion 232 on the opposite side thereto, slightly beneath the center of the vertical direction inside the rear region 160.

Due to the tether belt 222 being connected, a prescribed dimension of the rear region 160 of the center bag 220 after inflation and deployment is limited. More specifically, the vertical dimension of the rear region 160 is limited by the vertical tether 224. In addition, the vehicle width dimension on a slightly lower side of the rear region 160 is limited by the horizontal tether 226. As a result, upon inflation the internal pressure of the center bag 220 is increased, and a load is concentrated at an area in which dimensions are not limited by the tether belt 222. For this reason, the upper side of the rear region 160, which is not limited by the tether belt 222, expands in the vehicle width direction to form the curved surface 164. In this way, the curved surface 164 can also be formed on the rear region 160 by means of the tether belt 222, which limits dimensions at prescribed locations.

In a center bag 240 according to a third modified example illustrated in FIG. 10(*b*), two tether belts 242 and 244 are used. The tether belt 242 on the main bag 112 side is connected to the upper portion 228 in the rear region 160 and the side portion 230, which is slightly lower than the center of the vertical direction, in the rear region 160. The opposite side tether belt 244 is connected to the upper portion 228 and the side portion 232 on the opposite side to the side portion 230 in the vehicle width direction. Due to the tether belts 242 and 244 extending obliquely downward from the upper portion 228, it is mainly the vertical dimension of the rear region 160 of the center bag 240 that is limited. Due to increased internal pressure, the rear region 160 further expands in the vehicle width direction, which is not limited by the tether belts 242 and 244, to form the curved surface 164.

In a center bag 260 according to a fourth modified example illustrated in FIG. 10(*c*), only one tether belt 262 is used. The tether belt 262 extends in the vehicle width direction at a position slightly below the center of the vertical direction and is provided so as to bridge the side portion 230 and the side portion 232. The vehicle width dimension on a slightly lower side of the rear region 160 is limited by the tether belt 262. In the upper side, dimensions of which are not limited by the tether belt 262, upon inflation the internal pressure increases such that the upper side further expands in the vehicle width direction to form the curved surface 164.

Figure 10A:
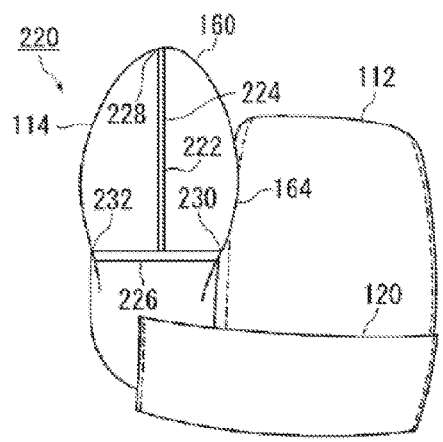
FIGS. 10(a), 10(b), and 10(c) are diagrams illustrating further modified examples of the center bag shown in FIGS. 3(a) and 3(b).
Figure 10B:
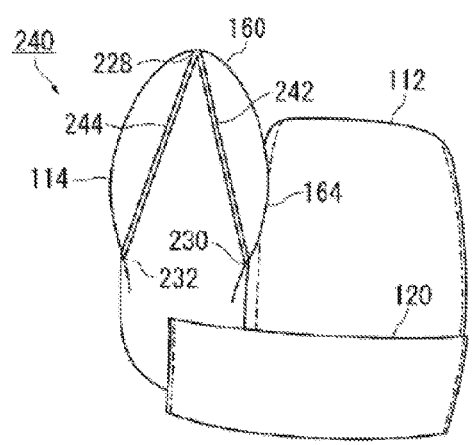
Figure 10C:
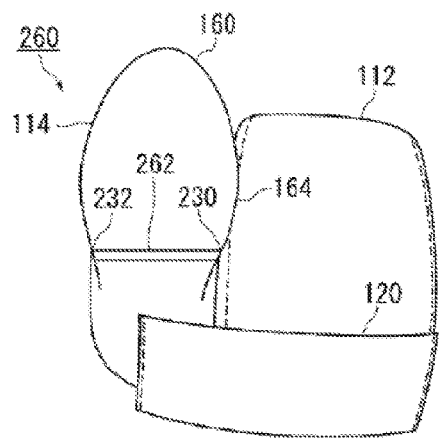

As shown in the center bags 220, 240, and 260 illustrated in FIG. 10(a) to FIG. 10(c), each tether belt bridges at least two locations inside the respective bags and, by limiting dimensions of prescribed regions of the center bags, the curved surface 164 can also be formed on the main bag 112 side by increasing the internal pressure in prescribed areas of the rear region 160 and causing these areas to further inflate in the vehicle width direction. Further, in the center bags 220 and 240, each of the tether belts are connected so as to mainly extend in the vertical direction, and each of the tether belts is configured to limit the respective vertical dimensions of the center bags 220 and 240. However, the tether belts may also, for example, be connected so as to extend in the vehicle front-rear direction of the center bag, thereby limiting the vehicle front-rear dimension of the center bag. This configuration also enables upon inflation the interior pressure of the center bag to be increased, and the rear region to be further expanded in the vehicle width direction.

In addition, as a further modified example of the cushion 108, the main bag and the center bag may, for example, be formed as independent bag-shaped portions, such that the main bag and the center bag are provided with separate housings and inflators. As another example, the main bag and the center bag may be independent of each other and equipped with separate inflators, yet be housed in the same single housing. The cushions of such configurations also enable the same functions achieved by the cushion 108, etc. described above to be realised by causing the center bag to project further towards the rear of the vehicle than the main bag and, further, providing the cleft 128, etc.

Although the preferred embodiments of the present invention have been described above with reference to the accompanying drawings, the embodiments described above are preferred examples of the present invention, and other embodiments can also be implemented or executed by various methods. Unless specifically indicated otherwise in the description of the present application, the present invention is not limited to the shapes, sizes, configuration arrangements, etc., of the detailed components shown in the accompanying drawings. Further, the expressions and terms used in the description of the present application are for explanatory purposes and, unless specifically indicated otherwise, are not limited thereto.

The invention claimed is:

1. An airbag apparatus for restraining an occupant of a vehicle, the airbag apparatus comprising,
   a main bag which is bag-shaped and is adapted to inflate and deploy in front of a front seat of the vehicle; and
   a center bag which is bag-shaped and is adapted to inflate and deploy on an inner side of the main bag in a vehicle width direction, wherein
   the center bag includes a rear region which extends further towards a rear of the vehicle than the main bag, and the center bag forming a rear end portion which is inclined in a generally straight line so as to gradually project toward the rear of the vehicle while advancing in an upward direction and
   a curved surface, which projects towards a main bag side in the vehicle width direction and is formed on the rear region, the curved surface overlaps the main bag when viewed from the rear of the vehicle.

2. The airbag apparatus according to claim 1, further comprising, a first vertex, which is an area of the curved surface that projects furthest in the vehicle width direction, is positioned further towards the rear of the vehicle than a second vertex, which is an area of a head of the occupant that projects furthest towards a center bag side in the vehicle width direction when the head of the occupant comes into contact with a rear portion of the main bag.

3. The airbag apparatus according to claim 1, further comprising, a first base fabric, which forms a side surface on the main bag side in the vehicle width direction of the rear region, has an area that is larger than that of a second base fabric, which forms a side surface of the rear region on an opposite side to the main bag side in the vehicle width direction.

4. The airbag apparatus according to claim 1, further comprising, a tether belt which is belt-shaped and bridges at least two areas inside the center bag, and limits a dimension of a prescribed region of the center bag such that upon inflation of the center bag a pressure inside the rear region is increased in order to cause the rear region to expand in the vehicle width direction.

5. The airbag apparatus according to claim 4, further comprising, the tether belt is connected to at least one of an upper portion and a rear portion inside the rear region and limits a vertical dimension or a vehicle width dimension of the rear region such that upon inflation of the center bag the rear region is caused to expand in the vehicle width direction.

6. The airbag apparatus according to claim 1, further comprising, the airbag apparatus restrains the head of the occupant at a vehicle rear side of a cleft formed between the main bag and the center bag.

7. The airbag apparatus according to claim 6, further comprising, the main bag and the center bag are integrated with each other below the cleft.

8. The airbag apparatus according to claim 1, further comprising,
   the airbag apparatus further comprises a tether belt which is belt-shaped and connected to a first connecting portion on an upper portion on the vehicle rear side of the center bag and a second connecting portion on an upper portion of the main bag, and
   the tether belt has a length which causes the tether belt to tense as the main bag and the center bag inflate and deploy and move in directions such that the first connecting portion and the second connecting portion separate from each other.

9. The airbag apparatus according to claim 8, further comprising, the second connecting portion is provided at a portion of the upper portion of the main bag on an inner side in the vehicle width direction.

10. The airbag apparatus according to claim 8, further comprising, the second connecting portion is provided further towards a front of the vehicle than the first connecting portion.

11. The airbag apparatus according to claim 1, further comprising, the main bag comes into contact with a windshield of the vehicle and an upper surface of an instrument panel of the vehicle upon inflation and deployment of the main bag.

12. The airbag apparatus according to claim 1, further comprising,
   the airbag apparatus further comprises a housing which is box-shaped and houses the main bag and the center bag, and is provided on an inner side of the upper surface of an instrument panel of the vehicle, and
   the main bag and the center bag upon inflation rip open the upper surface of the instrument panel so as to inflate and deploy.

13. The airbag apparatus according to claim 1, further comprising,
   a tie panel connecting the main bag and the center bag and attached to exterior surfaces of the main bag and the center bag.

\* \* \* \* \*